United States Patent
Lu et al.

(10) Patent No.: US 11,605,298 B2
(45) Date of Patent: Mar. 14, 2023

(54) PEDESTRIAN NAVIGATION BASED ON VEHICULAR COLLABORATIVE COMPUTING

(71) Applicant: Toyota Motor Engineering & Manufacturing North America, Inc., Plano, TX (US)

(72) Inventors: Hongsheng Lu, Mountain View, CA (US); Rui Guo, Mountain View, CA (US)

(*) Notice: Subject to any disclaimer, the term of this patent is extended or adjusted under 35 U.S.C. 154(b) by 348 days.

(21) Appl. No.: 16/776,443

(22) Filed: Jan. 29, 2020

(65) Prior Publication Data
US 2021/0233406 A1 Jul. 29, 2021

(51) Int. Cl.
*G08G 1/16* (2006.01)
*G08G 1/01* (2006.01)
(Continued)

(52) U.S. Cl.
CPC .......... *G08G 1/166* (2013.01); *B60W 30/0956* (2013.01); *G05D 1/0214* (2013.01);
(Continued)

(58) Field of Classification Search
None
See application file for complete search history.

(56) References Cited

U.S. PATENT DOCUMENTS

| 8,340,894 | B2 | 12/2012 | Yester |
| 8,849,688 | B2 | 9/2014 | Cash, Jr. et al. |

(Continued)

FOREIGN PATENT DOCUMENTS

| CN | 202753854 | 2/2013 |
| CN | 103158620 | 6/2013 |

(Continued)

OTHER PUBLICATIONS

Wang et al., "Toward mobility support for information-centric IoV in smart city using fog computing", 2017 IEEE International Conference on Smart Energy Grid Engineering, Aug. 2017, pp. 357-361. (Year: 2017).*

(Continued)

*Primary Examiner* — Todd Melton
(74) *Attorney, Agent, or Firm* — Burbage Law, P.C.; Jon-Michael Burbage

(57) ABSTRACT

The disclosure includes embodiments for pedestrian navigation by a group of connected vehicles executing a collaborative computing process. In some embodiments, a method includes analyzing pedestrian data generated by a pedestrian device and sensor data generated by the group of connected vehicles to determine digital twin data from a set that correlates with a scenario described by the pedestrian data and the sensor data. The digital twin data is an output of a historical digital twin simulation. The method includes predicting, based on the digital twin data, that the pedestrian is at risk of a collision. The method includes determining modified path data describing a modified walking path for the pedestrian. The method includes transmitting the modified path data to the pedestrian device so that the pedestrian is informed about the modified walking path and the risk is modified.

20 Claims, 3 Drawing Sheets

(51) Int. Cl.
*G08G 1/00* (2006.01)
*B60W 30/095* (2012.01)
*G05D 1/02* (2020.01)
*G06V 20/58* (2022.01)
*G06V 40/10* (2022.01)

(52) U.S. Cl.
CPC .............. *G06V 20/58* (2022.01); *G06V 40/10* (2022.01); *G08G 1/0112* (2013.01); *G08G 1/161* (2013.01); *G08G 1/22* (2013.01); *B60W 2554/4029* (2020.02); *B60W 2556/65* (2020.02)

(56) References Cited

U.S. PATENT DOCUMENTS

| | | |
|---|---|---|
| 8,903,640 B2 | 12/2014 | Caminiti et al. |
| 9,064,420 B2 | 6/2015 | Beckwith et al. |
| 9,211,837 B2 | 12/2015 | Lettström et al. |
| 9,421,909 B2 | 8/2016 | Strickland et al. |
| 9,805,592 B2 | 10/2017 | Ibrahim et al. |
| 9,881,430 B1 | 1/2018 | Shah et al. |
| 9,881,503 B1 | 1/2018 | Goldman-Shenhar et al. |
| 10,026,237 B1 | 7/2018 | Fields et al. |
| 10,182,952 B1 | 1/2019 | Nelson-Herron et al. |
| 10,282,233 B2 | 5/2019 | Liu et al. |
| 10,334,405 B2 | 6/2019 | Altintas et al. |
| 10,567,923 B2* | 2/2020 | Gade .................. G08G 1/0112 |
| 10,607,485 B2* | 3/2020 | Gupta .................. G08G 1/0962 |
| 10,855,753 B2* | 12/2020 | Kallakuri .............. H04L 67/101 |
| 10,893,107 B1* | 1/2021 | Callari .................. G06K 9/6231 |
| 11,079,764 B2* | 8/2021 | Nister .................. G05D 1/0278 |
| 2010/0039291 A1 | 2/2010 | Harrison et al. |
| 2011/0128161 A1 | 6/2011 | Bae et al. |
| 2011/0199199 A1 | 8/2011 | Perkins |
| 2011/0282793 A1 | 11/2011 | Mercuri et al. |
| 2013/0124052 A1 | 5/2013 | Hahne |
| 2014/0267263 A1 | 9/2014 | Beckwith et al. |
| 2016/0179094 A1 | 6/2016 | Sorokin et al. |
| 2018/0146323 A1 | 5/2018 | Tseng et al. |
| 2018/0241810 A1 | 8/2018 | Lerzer et al. |
| 2018/0257683 A1 | 9/2018 | Govindappa et al. |
| 2018/0321351 A1* | 11/2018 | Ignaczak ............ G08B 21/0423 |
| 2019/0132706 A1 | 5/2019 | Altintas et al. |
| 2019/0132819 A1 | 5/2019 | Tseng et al. |
| 2019/0189013 A1 | 6/2019 | Kim et al. |
| 2019/0191265 A1 | 6/2019 | Altintas et al. |
| 2019/0266295 A1 | 8/2019 | Masuda et al. |
| 2019/0287079 A1 | 9/2019 | Shiraishi et al. |

FOREIGN PATENT DOCUMENTS

| | | |
|---|---|---|
| CN | 103204123 | 7/2013 |
| CN | 205344677 | 6/2016 |
| KR | 20140046953 | 4/2014 |
| WO | 2018128946 | 7/2018 |

OTHER PUBLICATIONS

Alemneh et al., "PV-Alert: A fog-based architecture for safeguarding vulnerable road users", 2017 Global Information Infrastructure and Networking Symposium, Oct. 2017, pp. 9-15. (Year: 2017).*
Zhang et al., "Towards collaborative multi-device computing," 2018 IEEE International Conference on Pervasive Computing and Communications Workshops, Mar. 2018, pp. 22-27. (Year: 2018).*
Xie et al., "Collaborative Vehicular Edge Computing Networks: Architecture Design and Research Challenges," IEEE Access, vol. 7, pp. 178942-178952, Dec. 2019. (Year: 2019).*
Gerla, "Vehicular cloud computing," 2012 The 11th annual mediterranean ad hoc networking workshop (Med-Hoc-Net) IEEE, 2012, pp. 152-155.
Lee, et al., "Vehicular cloud networking: architecture and design principles," IEEE Communications Magazine, vol. 52, No. 2, 2014, pp. 148-155.
Hagenauer, et al., "Vehicular micro clouds as virtual edge servers for efficient data collection," in Proc. ACM CarSys, 2017, pp. 31-35.
Higuchi, et al., "On the Feasibility of Vehicular Micro Clouds," in Proc. IEEE VNC, 2017, pp. 179-182.
Hagenauer, et al., "Parked cars as virtual network infrastructure: Enabling stable V2I access for long-lasting data flows," in Proc. ACM CarSys, 2017, pp. 57-64.
Jiru, et al., "Data Aggregation in VANETs: a Generalized Framework for Channel Load Adaptive Schemes," 39th Annual IEEE Conference on Local Computer Networks, 2014, pp. 394-397.
Lim, et al., "Performance Analysis of Parallel Computing in a Distributed Overlay Network," TENCON 2011, pp. 1404-1408.

* cited by examiner

PEDESTRIAN NAVIGATION BASED ON VEHICULAR COLLABORATIVE COMPUTING

BACKGROUND

The specification relates to pedestrian navigation. In particular, this specification relates to pedestrian navigation system that executes a collaborative computing process among vehicles to provide pedestrian navigation.

Connected vehicles form clusters of interconnected vehicles (e.g., via vehicle-to-everything, i.e., "V2X") that are located at a similar geographic location. Such clusters are known as "vehicular micro clouds."

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for collaborative computing executed by a set of onboard computers for a group of connected vehicles, the method including: analyzing, by the set of onboard computers, pedestrian data generated by a pedestrian device and sensor data generated by the group of connected vehicles to determine digital twin data from a set that correlates with a scenario described by the pedestrian data and the sensor data, where the digital twin data is an output of a historical digital twin simulation; predicting, based on the digital twin data, that the pedestrian is at risk of a collision; determining modified path data describing a modified walking path for the pedestrian; and transmitting the modified path data to the pedestrian device so that the pedestrian is informed about the modified walking path and the risk is modified. Other embodiments of this aspect include corresponding computer systems, apparatus, and computer programs recorded on one or more computer storage devices, each configured to perform the actions of the methods.

Implementations may include one or more of the following features. The method further including an assigning step including assigning different tasks included in the method to different members of the group of connected vehicles. The method where the assigning step is executed by a hub vehicle of a vehicular micro cloud. The method where the assigning is based on technological abilities of a set of technological equipment included in the connected vehicles. The method where the assigning is based on a future driving path of the connected vehicles and how long each task takes to complete. The method where the modified path data is determined by analysis of the digital twin data. The method further including a feedback loop that includes determining whether a risk of collision was reduced by the modified walking path and updating the digital twin data based on whether the determination of whether a risk of collision was reduced. The method where the group of connected vehicles is not a vehicular micro cloud. Implementations of the described techniques may include hardware, a method or process, or computer software on a computer-accessible medium.

One general aspect includes a computer program product included in a set of onboard vehicle computers included in a group of connected vehicles, the computer program product including computer code that is operable, when executed by the set of onboard vehicle computers, to cause the set of onboard vehicle computers to provide collaborative computing by executing steps including: analyzing, by the set of onboard computers, pedestrian data generated by a head-mounted pedestrian device and sensor data generated by the group of connected vehicles to determine digital twin data from a set that correlates with a scenario described by the pedestrian data and the sensor data, where the digital twin data is an output of a historical digital twin simulation; predicting, based on the digital twin data, that the pedestrian is at risk of a collision; determining modified path data describing a modified walking path for the pedestrian; and transmitting the modified path data to the pedestrian device so that the pedestrian is informed about the modified walking path and the risk is reduced. Other embodiments of this aspect include corresponding computer systems, apparatus, and computer programs recorded on one or more computer storage devices, each configured to perform the actions of the methods.

Implementations may include one or more of the following features. The computer program product further including an assigning step including assigning different steps to different members of the group of connected vehicles. The computer program product where the assigning step is executed by a hub vehicle of a vehicular micro cloud. The computer program product where the assigning is based on technological abilities of a set of technological equipment included in the connected vehicles. The computer program product where the assigning is based on a future driving path of the connected vehicles and how long each task takes to complete. Implementations of the described techniques may include hardware, a method or process, or computer software on a computer-accessible medium.

One general aspect includes a system including: a group of connected vehicles communicatively coupled to one another via a network and each including a communication unit that is communicatively coupled to an onboard vehicle computer so that the group includes a set of onboard vehicle computers, where the set of onboard vehicle computers are executing computer-executable code that is operable, when executed by the set of onboard vehicle computers, to cause the set of onboard vehicle computers to provide collaborative computing by executing tasks including: analyzing, by the set of onboard computers, pedestrian data generated by a pedestrian device and sensor data generated by the group of connected vehicles to determine digital twin data from a set that correlates with a scenario described by the pedestrian data and the sensor data, where the digital twin data is an output of a historical digital twin simulation; predicting, based on the digital twin data, that the pedestrian is at risk of a collision; determining modified path data describing a modified walking path for the pedestrian; and transmitting the modified path data to the pedestrian device so that the pedestrian is informed about the modified walking path and the risk is modified. Other embodiments of this aspect include corresponding computer systems, apparatus, and computer programs recorded on one or more computer storage devices, each configured to perform the actions of the methods.

Implementations may include one or more of the following features. The system where an onboard vehicle computer of a hub vehicle included in the group of connected vehicles is further operable to execute an assigning operation that includes assigning different tasks to different members of the group of connected vehicles so that the different tasks are executed by the onboard vehicle computer of the member to which it is assigned. The system where the assigning is based on technological abilities of a set of technological equipment included in each of the group of connected vehicles so that more difficult tasks are assigned to connected vehicles having the more technological abilities and less difficult tasks are assigned to connected vehicles having less technological abilities. The system where the assigning is based on a future driving path of the connected vehicles and how long each task takes to complete. The system where the modified path data is determined by analysis of the digital twin data. The system where the tasks further include executing a feedback loop that includes determining whether a risk of collision was reduced by the modified walking path. The system where the feedback loop further includes updating the digital twin data based on whether the determination of whether the risk of collision was reduced. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
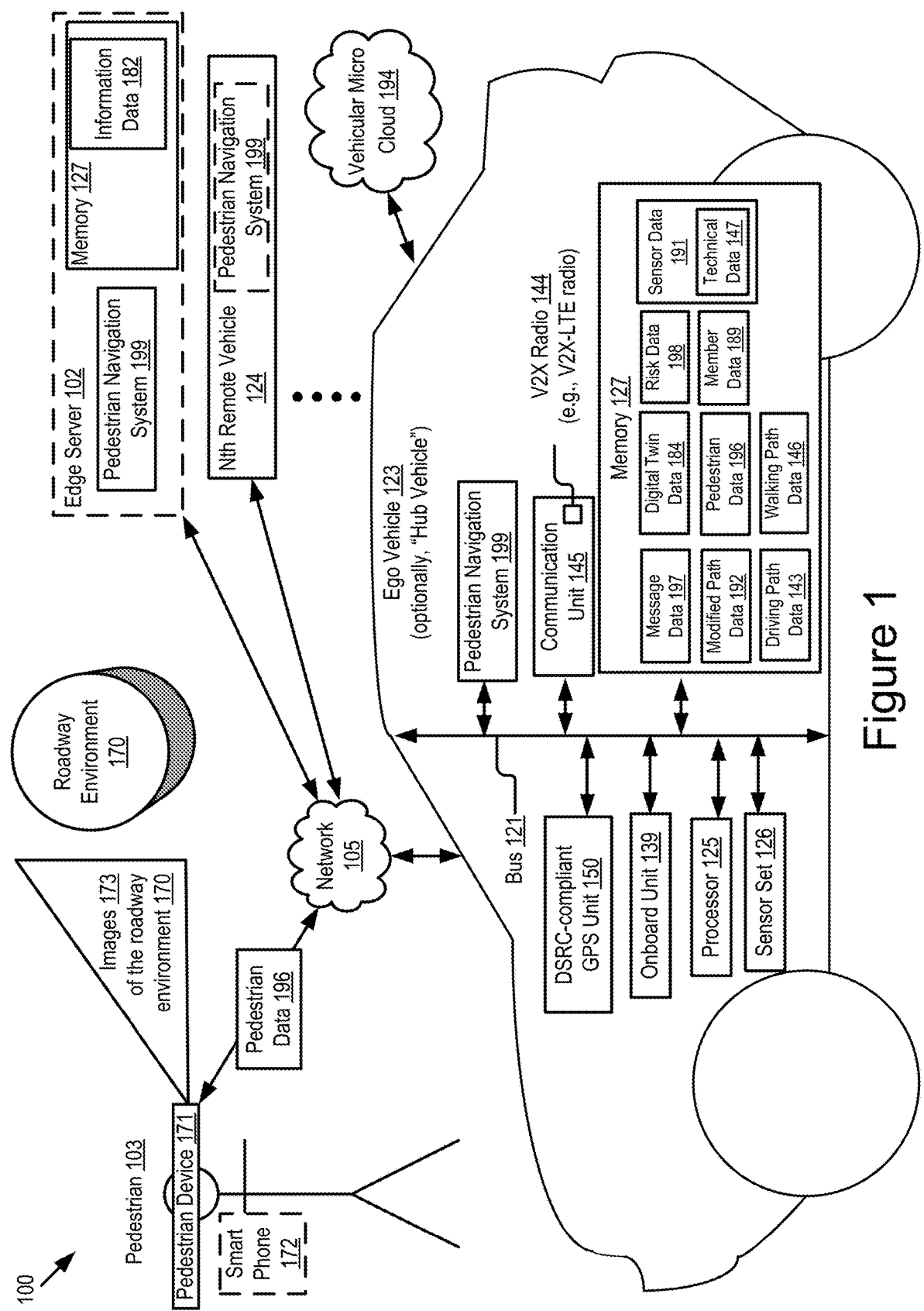
FIG. 1 is a block diagram illustrating an operating environment for a pedestrian navigation system according to some embodiments.

Described herein are embodiments that relate to a group of vehicles that collaboratively work together using V2X communication and collaborative computing to: (1) identify pedestrians within a roadway environment that are at risk; (2) notify the pedestrians about the risk; (3) determine new pedestrian walking paths for the pedestrians to walk so their safety is increased; and (4) notify the pedestrians about the new pedestrian walking paths. The process of helping pedestrians to discover new walking paths may be referred to herein as "pedestrian navigation," "helping pedestrians to navigate," or similar terminology.

The embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over vehicle-to-vehicle (V2V) networks or V2X networks to perform computation, data storage, and data communication tasks in an efficient way. These types of tasks are referred to herein as "computational tasks."

Vehicular micro clouds are beneficial, for example, because they help vehicles to perform computationally expensive tasks that they could not perform alone or store large data sets that they could not store alone. The members that form a vehicular micro cloud may execute computing processes (e.g., such as those depicted in FIG. 3 or the first or second example general methods described below) together in parallel by a cooperative process. A "cooperative process" is sometimes referred to herein as a "collaborative process," a "method for collaborative computing," or some other reference to "collaborative computing." Individual steps of the computing processes may be executed by one or more vehicles in a collaborative fashion. The cooperative process may include the members exchanging V2X communications with one another that communicate outputs of their computations or digital data that may be beneficial to other members.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

A typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

Vehicular micro clouds are accessible by various types of devices. For example, vehicular micro clouds are accessible by pedestrian devices. A pedestrian device is a processor-based electronic device that is operable to capture images, relay wireless messages including pedestrian data, and provide audio feedback to a user. In some embodiments, a pedestrian device is an electronic device that includes a camera that is operable to capture images of a roadway environment, a non-transitory memory that is operable to store digital data and computer code, a processor that is operable to execute the computer code, and a communication unit (e.g., a V2X radio) that is operable to send and receive wireless messages that include payloads such as digital data that describes the camera images or information describing a walking path for a pedestrian. In some embodiments, a pedestrian device is a processor-based computing device that is wearable on a head of a pedestrian such as smart glasses or augmented reality goggles (AR goggles).

The pedestrian device also includes a client stored in the non-transitory memory of the pedestrian device which is accessible by the processor of the pedestrian device. The client includes code and routines that are operable, when executed by the processor, to cause the processor to control the operation of the camera of the pedestrian device to capture images of a roadway environment, build V2X wireless messages including pedestrian data that describes the images, and broadcast the V2X wireless messages to nearby connected vehicles that are within V2X transmission range of the pedestrian device. The client is also operable to receive V2X wireless messages from the pedestrian navigation system describing a risk to the pedestrian and instructions for a new walking path for the pedestrian. The pedestrian device includes an electronic display, a speaker, or some other peripheral that is accessible and controllable by the client so that the client can cause the pedestrian to be informed about the risk and the new walking path.

In some embodiments, the pedestrian device captures images of a roadway environment as the pedestrian is attempting to cross a roadway (or slightly before this time).

In some embodiments, the pedestrian device includes a V2X radio. The V2X radio operates in compliance with a V2X protocol. In some embodiments, the V2X radio broadcasts Basic Safety Messages ("BSM" or "safety message" if singular, "BSMs" or "safety messages" if plural). In some embodiments, the safety messages broadcast by the pedestrian device includes the pedestrian data as its payload. In some embodiments, the pedestrian data is included in part 2 of the safety message as specified by the DSRC protocol.

In some embodiments, the pedestrian data is digital data that describes, among other things, images of a roadway environment as captured by the camera of the pedestrian device. An example of the pedestrian data includes the pedestrian data 196 depicted in FIG. 1.

In some embodiments a pedestrian device is not a smartphone.

As used herein, the term "vehicle" refers to a connected vehicle. For example, the ego vehicle and remote vehicle depicted in FIG. 1 are connected vehicles. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

One problem is that people have a difficult time crossing roadways on foot. This is particularly true of elderly people, children, blind persons, and all people in certain weather/environmental conditions (e.g., nighttime in rural environments, a "white out" snowstorm, very heavy rainfall, times of very bright sunshine, etc.). Solving this problem is important for the purpose of providing increased safety for pedestrians. The embodiments of the pedestrian navigation system described herein solve this problem.

Described herein are embodiments of a pedestrian navigation system. In some embodiments, the pedestrian navigation system improves the performance of a vehicular micro could because it beneficially enables the vehicular micro cloud to take steps to increase the safety of pedestrians in a roadway environment. In some embodiments, the pedestrian navigation system uses pedestrian data generated by a pedestrian device, which are worn by a pedestrian, as an input to a collaborative computing process which is executed by a group of vehicles and configured to execute steps including: (1) determining that a pedestrian is at risk of a collision (e.g., a collision with a vehicle); (2) determining a new walking path for the pedestrian that would remove the risk; and (3) informing the pedestrian, via their pedestrian device, about the risk and the new walking path that would eliminate the risk. The new walking path may be provided in the form of step-by-step instructions. The collision risk may be a risk of a collision with a vehicle, including those that are not included in the group of vehicles, or some other roadway object. The pedestrian device may be AR goggles, smart glasses, or any other pedestrian device that is not a smartphone.

Some solutions to the problem described above might include a vehicle that has an outward facing electronic display mounted on the outside of the vehicle that displays a visual warning for pedestrians in case of collision; other solutions include a speaker of a vehicle that provides audible warnings for pedestrians. The pedestrian navigation system described herein specifically does not include an electronic display mounted on the outside of a vehicle and/or a speaker of a vehicle that provides warnings for a pedestrian.

Accordingly, the pedestrian navigation system improves the performance of a vehicle by enabling it to participate in a collaborative computing process with other vehicles that increases the safety of pedestrians that are in a roadway environment that includes the vehicles and the pedestrian.

The pedestrian navigation system includes code and routines that are operable, when executed by the onboard vehicle computers of a group of connected vehicles, to provide one or more of the following example functionality and benefits: (1) executing a collaborative computing process that is optimized to increase the safety of the pedestrian; (2) using digital twin simulations to predict the future walking path of the pedestrian; (3) using digital twin simulations to select a modified walking path for the pedestrian that is optimized to increase the pedestrian's safety; (4) a feedback loop which increase the accuracy of future digital twin simulations over time based on the real-world outcomes of (a) predictions about the future walking paths of the pedestrian which are made based on historical digital twin simulations, and/or (b) a modified walking path selected based on the historical digital twin simulations; (5) a hub of a vehicular micro cloud, or some other group of connected vehicles which execute a collaborative computing process, which uses technology data and data about the future driving paths of vehicles to determine which vehicles should perform which steps (or portions of steps) from a method which is configured to determine a new walking path for a pedestrian whose safety is at risk; (6) a hub of a vehicular micro cloud, or some other group of connected vehicles which execute a collaborative computing process, that uses technical data and information about the future driving paths of vehicles included in the vehicular micro cloud to assign tasks to the members of the vehicular micro cloud so that (a) more complex tasks are completed by more technically sophisticated vehicles and/or (b) tasks are assigned in consideration of how long each task will take to complete relative to how long each vehicle is estimated to remain a member of the vehicular micro cloud based on their future driving path relative to the future driving paths of the other members of the vehicular micro cloud; and (7) a vehicle having a data structure that includes sensor data from a plurality of vehicles, pedestrian data from a pedestrian device, and digital twin data from a server/roadside unit. The functionality and benefits described in this paragraph are illustrative and not an exhaustive list of the functionality and benefits provided by the embodiments of the pedestrian navigation system described herein.

Examples of the pedestrian navigation system are now described according to some embodiments. In some embodiments, the pedestrian navigation system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; an edge server; and a pedestrian. For the purpose of clarity, the N remote vehicles may be referred to herein as the "remote vehicle" or the "remote vehicles" and this will be understood to describe N remote vehicles.

The ego vehicle and the remote vehicles may be human-driven vehicles, autonomous vehicles, or a combination of human-driven vehicles and autonomous vehicles. In some embodiments, the ego vehicle and the remote vehicles may be equipped with Dedicated Short-Range Communication (DSRC) equipment such as a GPS unit that has lane-level accuracy and a DSRC radio that is capable of transmitting DSRC messages.

In some embodiments, the ego vehicle and some or all of the remote vehicles include their own instance of a pedestrian navigation system. For example, in addition to the ego vehicle, some or all of the remote vehicles include an onboard unit having an instance of the pedestrian navigation system installed therein.

Accordingly, multiple instances of the pedestrian navigation system are installed in a group of connected vehicles. The group of connected vehicles may be arranged as a vehicular micro cloud or some other vehicular cloud. In some embodiments, the ego vehicle and the remote vehicles are members of a vehicular micro cloud. In some embodiments, the remote vehicles are members of a vehicular micro cloud, but the ego vehicle is not a member of the vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud, meaning that they are members of various vehicular micro clouds that are all members of the same vehicular macro cloud so that they are still interrelated to one another and operable to execute a collaborative computing process.

Example General Methods

Two example general methods are now described. For the purpose of understanding these example general methods, assume that an operating environment includes a pedestrian and a group of connected vehicles that includes an ego vehicle and a remote vehicle. The pedestrian is wearing a pedestrian device. The pedestrian devices include a client. The client includes code and routines that, when executed by a processor of the pedestrian device, causes the pedestrian device to capture images and transmit a wireless message to the group of vehicles. The wireless message includes pedestrian data as its payload. The pedestrian data is digital data that describes the images captured by the pedestrian device. Some of these images may include images of the ego vehicle and/or the remote vehicle.

In some embodiments, the pedestrian data describes the environment (e.g., weather, lighting conditions, visibility, etc.) in which the pedestrian is present and also whether the pedestrian is visually impaired. In some embodiments, the pedestrian data is generated by a phone or a combination of the smartphone and the pedestrian device.

In some embodiments, in both the first example general method and the second example general method, the pedestrian navigation systems of the ego vehicle and the remote vehicle receive the pedestrian data from the network (e.g., a V2X network).

A first example general method is now described. As described above, in some embodiments the pedestrian navigation system is installed in the onboard units of the group of connected vehicles. The pedestrian navigation system includes computer code that is operable, when executed by the set of onboard vehicle computers, to cause the set of onboard vehicle computers to provide collaborative computing by executing some or all of the steps of the first example general method described below. The pedestrian navigation system of a hub vehicle included in the group of connected vehicles determines, from among the group of vehicles, which of the vehicles will execute the following steps, or portions of the following steps of the first example general method, and then informs the other vehicles about the results of this determination:

Step 1: The pedestrian navigation systems of the group of connected vehicles receive pedestrian data broadcast by the client of the pedestrian device using the communication unit of the pedestrian device.

Step 2: Cause the onboard sensors of an ego vehicle (as well as one or more remote vehicles) to record sensor data;

Step 3: Receive V2X messages from the other vehicles in the group which includes their sensor data as a payload;

Step 4: Determine whether the pedestrian is crossing a roadway;

Step 5: Predict a future walking path of the pedestrian;

Step 6: Predict future locations of roadway objects in the roadway environment;

determine that the pedestrian is at risk;

Step 7: Generate modified path data that describes a modified path for the pedestrian to walk when crossing the roadway in order to maximize their safety; and Step 8: Use V2X communication to provide the modified path data to the pedestrian device so that the pedestrian device provides feedback to the pedestrian describing the modified path. The feedback may be provided in the form of visual information, auditory information, a combination of audio/visual information, haptic feedback, or some other type of sensory feedback provided by the pedestrian device.

In some embodiments, some or all of the steps described above are collaboratively executed by the onboard vehicle computers of two or more vehicles. In some embodiments, some or all of the steps described above are collaboratively executed by the onboard vehicle computers of a vehicular micro cloud.

A second example general method is now described. In some embodiments, the pedestrian navigation system is installed in the onboard units of the group of connected vehicles. The pedestrian navigation system includes computer code that is operable, when executed by the set of onboard vehicle computers, to cause the set of onboard vehicle computers to provide collaborative computing by executing some or all of the steps of the second example general method described below:

Step 1: Receive pedestrian data from a pedestrian device worn by a pedestrian. The pedestrian data includes digital data describing one or more of the following: images of the roadway environment, optionally including images of the vehicles; descriptions of the weather; descriptions of the visibility; descriptions of the quantity of light; the GPS location of the pedestrian; the path history of the pedestrian; and whether the pedestrian is visually impaired. An example of the pedestrian data includes the pedestrian data 196 depicted in FIG. 1.

Step 2: Cause the onboard sensors of the group of vehicles to record sensor data. The sensor data includes digital data describing one or more of the following: images of the roadway environment, optionally including images of the pedestrian; descriptions of the visibility; descriptions of the quantity of light; GPS data of the vehicles; the future driving paths of the vehicles. An example of the sensor data includes the sensor data 191 depicted in FIG. 1. In some embodiments, the sensor data 191 includes driving path data 143. The driving path data 143 includes digital data that describes the future driving path of a vehicle which generates the sensor data.

Step 3: The group of vehicles exchange V2X messages among themselves to share their sensor data with one another. In some embodiments, the V2X messages include the sensor data as their payload. An example of the sensor data includes the sensor data 191 depicted in FIG. 1. The ego vehicle 123 depicted in FIG. 1 generates its own sensor data 191 and receives the sensor data 191 of the remote vehicles 124 via the V2X messages described in step 3 of the second example general method.

Step 4: Determine, from among a group of vehicles, which of the vehicles will execute the following steps (or portions of the following steps) and then inform the other vehicles about the results of this determination. If the group of vehicles is a vehicular micro cloud, then this step is executed by the hub vehicle of the vehicular micro cloud.

In some embodiments, the hub vehicle stores technical data. The technical data includes digital data describing the technological capabilities of each vehicle included in the vehicular micro cloud. The hub vehicle also has access to each vehicle's sensor data from steps 2 and 3 of the second example general method. An example of the technical data includes the technical data 147 depicted in FIG. 1. The technical data 147 is an element of the sensor data 191. In some embodiments, the vehicles execute step 3 of the second example general method to distribute their sensor data 191 and this sensor data 191 includes the technical data 147 for each vehicle that executes the step 3; in this way, the hub vehicle receives the technical data 147 for each of the vehicles included in the vehicular micro cloud.

In some embodiments, the pedestrian navigation system analyzes the steps to be executed as well as the technical data 147 and driving path data 143 describing the future navigation plans of each vehicle. The driving path data 143 is helpful because some vehicles might be leaving the geographic area soon, and so, they will leave the vehicular micro cloud and afterward be unable to execute steps of this method, thereby limiting the time window during which they are available to assist.

In some embodiments, the pedestrian navigation system of the hub vehicle assigns steps or portions of the steps based on the technical data in view of the complexity of each step/portion so that more complex steps/portions are assigned to more technologically sophisticated vehicles within the group and less complex steps/portions are assigned to less technologically sophisticated vehicles.

In some embodiments, the pedestrian navigation system also considers the future navigation plans of vehicles so that they are not assigned steps/portions if they are leaving the vehicular micro cloud soon or they may be assigned some steps/portions because their future location makes them better suited to perform that particular step/portion.

In some embodiments, the hub vehicle also stores the member data. An example of the member data includes the member data 189 depicted in FIG. 1. In some embodiments, the member data 189 is also an element of the sensor data 191 which is shared among the members at step 3 of the second example general method described above. A member of a vehicular micro cloud is described herein as a "member" or a "micro cloud member." The member data 189 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

Step 5: If multiple pedestrians are nearby, determine which pedestrian is the transmitter of the pedestrian data (e.g., based on the GPS data and/or the images included in the pedestrian data which may also be compared to the images captured by the vehicles themselves). It will be understood that when the following steps say "pedestrian," they are referring to this particular pedestrian and not the other pedestrians that may be present near the roadway.

Step 6: Determine whether the pedestrian is crossing a roadway.

Step 7: Predict a future walking path of the pedestrian. This step may be determined from the path history of the pedestrian which is described by the pedestrian data. In some embodiments, this step may be determined based on digital twin analysis conducted by the pedestrian navigation system using the pedestrian data and the sensor data as inputs to the digital twin analysis. In some embodiments, the digital twin analysis may include execution of new digital twin simulations based on these inputs or comparing the pedestrian data/sensor data to the output of previously performed digital twin simulations to determine which simulation is most similar to the scenario indicated by the pedestrian data/sensor data and then predicting the future walking path of the pedestrian based on this output.

In some embodiments, the digital twin data includes digital data that describes all the digital data necessary to generate a digital twin simulation that duplicates the real-world roadway environment. The digital twin data includes, for example, sensor data that describes the roadway environment (e.g., the roadway environment 170 depicted in FIG. 1) in exact detail and simulation data that describes a digital twin simulation that includes the ego vehicle, the remote vehicle, and the pedestrian interacting in a digital twin simulation that includes the digital twin of the real-world as described by the sensor data that is included in the digital twin data. In some embodiments, the pedestrian navigation system 199 includes a game engine and any simulation software which is necessary to generate the digital twin data 184, execute one or more digital twin simulations based on the digital twin data 184, the sensor data 191 and/or the pedestrian data 196, and analyze the outcome of these digital twin simulations to predict the future walking path of the pedestrian. An example of the digital twin data is depicted in FIG. 1 as digital twin data 184.

Examples of digital twin data, game engines, and simulation software are described in the following patent applications, the entirety of each of which are hereby incorporated by reference: U.S. patent application Ser. No. 16/691,346 entitled "DIGITAL TWIN SIMULATION-BASED VEHICULAR COMMUNICATION PLANNING" and filed on filed on Nov. 21, 2019; U.S. patent application Ser. No. 16/007,693 entitled "DIGITAL TWIN FOR VEHICLE RISK EVALUATION" and filed on Jun. 13, 2018; U.S. patent application Ser. No. 15/925,070 entitled "SENSOR-BASED DIGITAL TWIN SYSTEM FOR VEHICULAR ANALYSIS" and filed on Mar. 19, 2018; U.S. patent application Ser. No. 16/165,002 entitled "DIGITAL BEHAVIORAL TWIN SYSTEM FOR INTERSECTION MANAGEMENT IN CONNECTED ENVIRONMENTS" and filed on Oct. 19, 2018; U.S. patent application Ser. No. 16/007,796 entitled "COLLISION AVOIDANCE FOR A CONNECTED VEHICLE BASED ON A DIGITAL BEHAVIORAL TWIN" and filed on Jun. 13, 2018; and U.S. patent application Ser. No. 15/908,768 entitled "PROACTIVE VEHICLE MAINTENANCE SCHEDULING BASED ON DIGITAL TWIN SIMULATIONS" and filed on Feb. 28, 2018.

In some embodiments, output of the digital twin simulations is the walking path data. The walking path data includes digital data that describes the predicted future walking path of the pedestrian as indicated by one or more digital twin simulations executed by the pedestrian navigation system. An example of the walking path data is depicted in FIG. 1 as walking path data 146.

Step 8: Predict future locations of roadway objects (e.g., vehicles) in the roadway environment. In some embodiments, this step is executed by the pedestrian navigation system based on analysis of the sensor data which each vehicle included in the group shares with one another (e.g., via BSM or the V2X message broadcast by each vehicle at step 3 described above for this second example general method). This sensor data includes data describing the future driving plans of each vehicle.

Step 9: Determine the environmental conditions based on the pedestrian data and the sensor data. The environmental conditions include, for example, one or more of the following: the weather conditions; the visibility conditions; the quantity of the light; and whether the pedestrian is visually impaired.

Step 10: Determine that the pedestrian is at risk. A pedestrian is determined by the pedestrian navigation system to be at risk, for example, because their predicted walking path intersects with a future location of a roadway object. The pedestrian navigation system may also determine that a pedestrian's status as being at risk is affected by the environmental conditions determined at step 9. In some embodiments, the output of this step is the risk data. The risk data is digital data that describes whether particular pedestrians are at risk and, optionally, the urgency of their risk. An example of the risk data is depicted in FIG. 1 as the risk data 198.

Step 11: Generate modified path data based on some or all of the digital data described herein. In some embodiments, the pedestrian navigation system generates the modified path data based on the driving path data for the various vehicles and the risk posed to the pedestrian as the pedestrian's walking path gets closer to these various driving paths. For example, the pedestrian navigation system analyses the driving paths described by the driving path data and various risks to the pedestrian associated with each of these driving paths to identify a walking path for the pedestrian and/or a time for walking by the pedestrian which has a lowest possible risk to the pedestrian. The modified path data includes digital data that that describes a modified path for the pedestrian to walk when crossing the roadway in order to maximize their safety.

An example of the modified path data includes the modified path data 192 depicted in FIG. 1.

In some embodiments, step 11 may be executed by the pedestrian navigation system based on digital twin analysis conducted by the pedestrian navigation system using one or more of the following: the predicted walking path of the pedestrian; predict future locations of roadway objects in the roadway environment; the environmental conditions; and the nature of the pedestrian's risk. The digital twin analysis may include execution of new digital twin simulations based on these inputs which outputs the modified path data.

In some embodiments, the digital twin analysis may include comparing the current scenario to the output of previously performed digital twin simulations to determine which simulation is most similar to the scenario presently indicated (but also includes a safe outcome for the pedestrian) and then outputting the walking path from this simulation as the modified walking path for the pedestrian. This walking path is described by the modified path data which is outputted by the pedestrian navigation system as a result of executing these digital twin simulations. In some embodiments, this portion of step 11 is optimized to select a simulation in which the pedestrian walks a path that is the safest for the pedestrian relative to other possible walking paths as indicated in other simulations.

Step 12: Use V2X communication to provide the modified path data to the pedestrian device so that the pedestrian device provides feedback to the pedestrian describing the modified path. The feedback may be provided in the form of visual information, auditory information, a combination of audio/visual information, haptic feedback, or some other type of sensory feedback provided by the pedestrian device. In some embodiments, this step includes generating a V2X message that includes the message data as its payload. The message data is digital data that describes the V2X message and the payload for this V2X message. An example of the message data includes the message data 197 depicted in FIG. 1. The message data 197 includes the modified path data 192 as an element of the digital data included in the message data 197. In this way, the V2X message of step 12 of the second example general method informs the pedestrian devices about the modified path data 192.

Step 13: Step 13 of the second example general method includes a feedback loop and/or learning subsystem of the pedestrian navigation system. In some embodiments, digital twin simulations are executed by an edge server and/or cloud server which provides the digital twin data to the vehicles.

In some embodiments, the vehicles included in the group of vehicles report back the outcome of steps 1-12 to the edge server and/or cloud server (e.g., the edge server 102 depicted in FIG. 1). The outcome includes a V2X message transmitted by the vehicles. The V2X message includes information data as its payload. The information data includes digital data that describes the outcome of the modified pedestrian walking path, i.e., whether safety was actually improved. This information data serves as a form of feedback which is then used to execute new updated digital twin simulations, which yields updated digital twin data which is outputted to the vehicles. In this way, the process continually improves over time based on use of the feedback loop by the edge server/cloud server and the edge server/cloud server continually providing refreshed digital twin data to the vehicles.

In some embodiments, an instance of the pedestrian navigation system is also installed in a cloud server or an edge server that is communicatively coupled to the same wireless network as a vehicle (e.g., the ego vehicle) that also includes an instance of the pedestrian navigation system installed in its ECU.

Hub Vehicle

Figure 3:
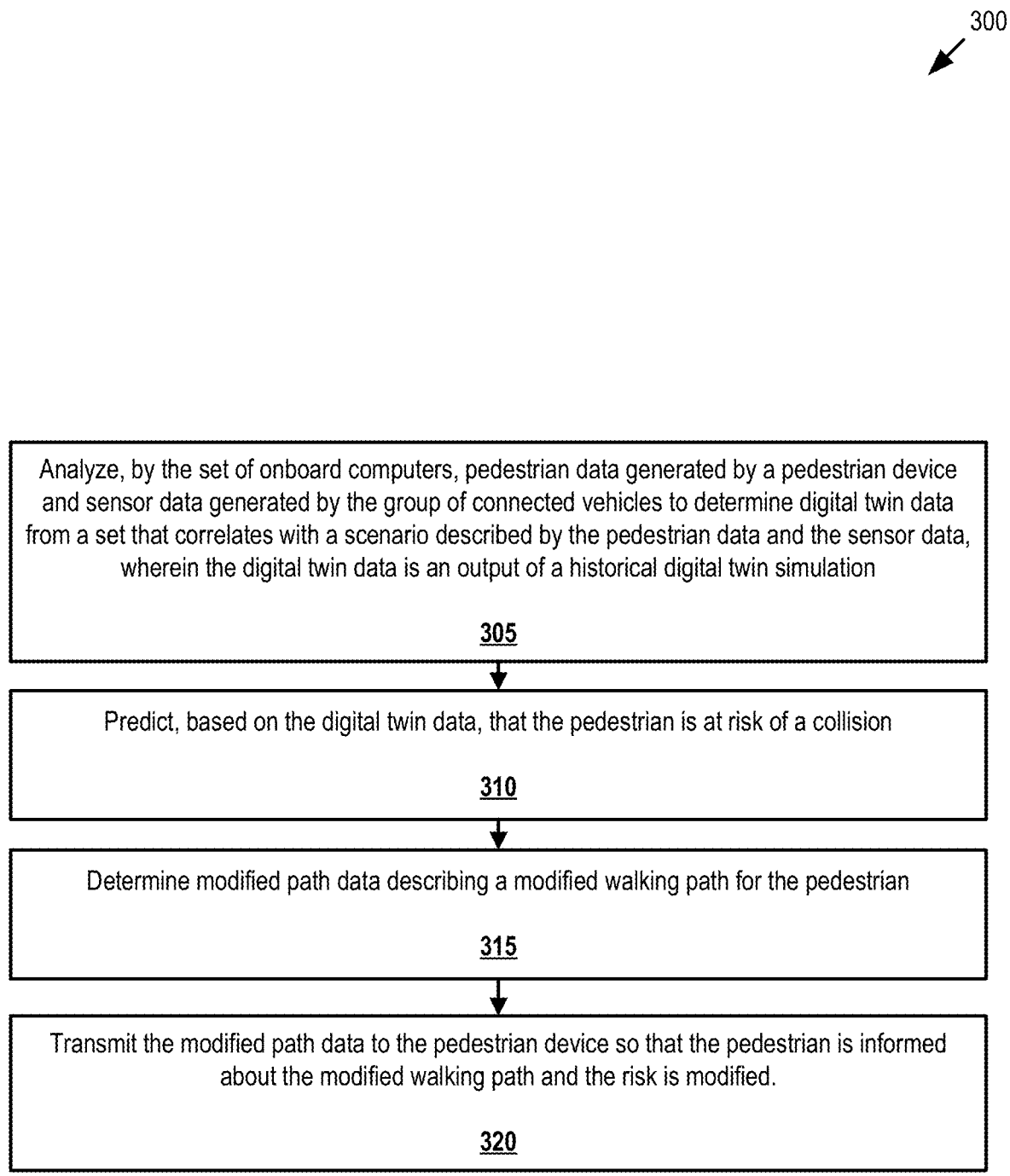
FIG. 3 is a flowchart of an example method for providing pedestrian navigation using a collaborative computing process executed by a group of connected vehicles according to some embodiments.

In some embodiments, a method executed by the pedestrian navigation system (e.g., the first example general method described above, the second example general method described above, or some other method such as that depicted in FIG. 3) includes a hub vehicle. For example, the vehicular micro cloud formed by the pedestrian navigation system includes a hub vehicle that provides the following example functionality: controlling when the set of member vehicles leave the vehicular micro cloud (i.e., managing the membership of the vehicular micro cloud, such as who can join, when they can join, when they can leave, etc.); determining how to use the pool of vehicular computing resources to complete a set of tasks in an order for the set of member vehicles wherein the order is determined based on a set of factors that includes safety; determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

In some embodiments, the hub vehicle is determined by the pedestrian navigation system based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub is having the most accurate sensors, most bandwidth, and most memory. Accordingly, the designation of which vehicle is the hub vehicle may be based on a set of factors that includes which vehicle has: (1) the fastest onboard computer; (2) the most accurate sensors; (3) the most bandwidth or other network factors such having radios compliant with the most modern network protocols; and (4) most available memory.

In some embodiments, the designation of which vehicle is the hub vehicle changes over time if a more technologically sophisticated vehicle joins the vehicular micro cloud. Accordingly, the designation of which vehicle is the hub vehicle is dynamic and not static. In other words, the designation of which vehicle is the hub vehicle can change on the fly if a "better" hub vehicle joins the vehicular micro cloud.

In some embodiments, the hub vehicle is whichever member vehicle of a vehicular micro cloud has a fastest onboard computer.

In some embodiments, the pedestrian navigation system is operable to provide its functionality to operating environments and network architectures that do not include a server. Use of servers is problematic because they create latency. For example, some prior art systems require that groups of vehicles relay all their messages to one another through a server. This is particularly problematic and prone to latency which renders the solution inoperable in real-world scenarios, especially for safety critical scenarios. By comparison, the use of server is an optional feature in for the pedestrian navigation system. Indeed, the preferred embodiment would not include a server since, for example: (1) inclusion of a server leads to undesirable latency; and (2) the computational power of the server is not needed by the vehicular micro clouds because the whole point of vehicular micro clouds is to harness the unused computational abilities of the fleet of vehicles that are on the roadway at any given time.

In some embodiments, the pedestrian navigation system is operable to provide its functionality even though the vehicle which includes the pedestrian navigation system does not have a Wi-Fi antenna as part of its communication unit. By comparison, some of the existing solutions require the use of a Wi-Fi antenna in order to provide their functionality. Because the pedestrian navigation system does not require a Wi-Fi antenna, it is able to provide its functionality to more vehicles, including older vehicles without Wi-Fi antennas.

In some embodiments, the pedestrian navigation system is operable to provide its functionality even though the vehicle which includes the pedestrian navigation system does not have a DSRC radio as part of its communication unit. By comparison, some of the existing solutions require the use of a DSRC radio in order to provide their functionality. Because the pedestrian navigation system does not require a DSRC radio, it is able to provide its functionality to more vehicles, including older vehicles without DSRC radios.

In some embodiments, the pedestrian navigation system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the pedestrian navigation system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the pedestrian navigation system manages the vehicular micro cloud so that it is accessible for membership by vehicles which do not have V2V communication capability. This is beneficial because it ensures that legacy vehicles have access to the benefits provided by the vehicular micro cloud. The existing approaches do not provide this functionality.

In some embodiments, the pedestrian navigation system is configured so that a particular vehicle (e.g., the ego vehicle) is pre-designated by a vehicle manufacturer to serve as a hub vehicle for any vehicular micro cloud that it joins. The existing approaches do not provide this functionality.

Vehicular Micro Clouds

The existing solutions generally do not include vehicular micro clouds. Many groups of vehicles (e.g., cliques) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one. Accordingly, any group of vehicles that includes a server or whose functionality incorporates a server is not a vehicular micro cloud.

In some embodiments, a vehicular micro cloud is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does not serve the purpose of harnessing the unused computing resources of many different vehicles to perform complex computational tasks that a single vehicle alone cannot perform is not a vehicular micro cloud.

In some embodiments, the vehicular micro cloud can include vehicles that are parked, vehicles that are traveling in different directions, infrastructure devices, or almost any endpoint that is within communication range of a member of the vehicular micro cloud.

In some embodiments, vehicles are required to have a predetermined threshold of unused computing resources to become members of a vehicular micro cloud. In some embodiments, a hub of a vehicular micro cloud is pre-designated by a vehicle manufacturer by the inclusion of one a bit or a token in a memory of the vehicle that designates the vehicle as the hub of all vehicular micro clouds which it joins.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of the methods described herein (e.g., the first example general method described above, the second example general method described above, or the method depicted in FIG. 3) may be executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

A vehicular micro cloud may include vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds.

A vehicular micro cloud is responsible to doing computational analysis itself using the onboard vehicle computers of its members. A group of vehicles which relies on a cloud server for its computational analysis, or the difficult parts of its computational analysis, is not a vehicular micro cloud. Although FIG. 1 depicts a server in an operating environment that includes the pedestrian navigation system, the server is an optional feature of the operating environment. An example of a preferred embodiment of the pedestrian navigation system does not include the server in the operating environment which includes the pedestrian navigation system.

In some embodiments, the pedestrian navigation system enables a group of vehicles to perform computationally expensive tasks that could not be completed by any one vehicle in isolation.

Example Operating Environment

The pedestrian navigation system utilizes a vehicular network in some embodiments. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

In some embodiments, the pedestrian navigation system includes software installed in an onboard unit of a connected vehicle. This software is the "pedestrian navigation system" described herein.

An example operating environment for the embodiments described herein includes an ego vehicle and at least one remote vehicle. The ego vehicle and the remote vehicle are both connected vehicles having communication units that enable them to send and receive wireless messages via one or more vehicular networks. In some embodiments, both the ego vehicle and the remote vehicle include an onboard unit having a pedestrian navigation system stored therein. An example of a preferred embodiment of the pedestrian navigation system includes a serverless operating environment which does not include a server.

In some embodiments, the pedestrian navigation system includes code and routines that are operable, when executed by a processor of the onboard unit, to cause the processor to execute one or more of the steps of the first example general method, the second example general method, and/or the method 300 depicted in FIG. 3.

This application is related to U.S. patent application Ser. No. 15/644,197 filed on Jul. 7, 2017 and entitled "Computation Service for Mobile Nodes in a Roadway Environment," the entirety of which is hereby incorporated by reference.

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a DSRC-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a DSRC-compliant GPS unit is operable to identify, monitor and track its two-dimensional position within 1.5 meters, in all directions, of its actual position 68% of the time under an open sky.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the pedestrian navigation system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a Basic Safety Message (BSM).

In some embodiments, instances of "DSRC" as used herein may be replaced by the term "C-V2X." For example, the term "DSRC radio" is replaced by the term "C-V2X radio," the term "DSRC message" is replaced by the term "C-V2X message," and so on.

Embodiments of the pedestrian navigation system are now described. Referring now to FIG. 1, depicted is a block diagram illustrating an operating environment 100 for a pedestrian navigation system 199 according to some embodiments. The operating environment 100 is present in a geographic region so that each of the elements of the operating environment 100 is present in the same geographic region.

The operating environment 100 may include one or more of the following elements: an ego vehicle 123 (referred to herein as a "vehicle 123" or an "ego vehicle 123"); a pedestrian device 171 worn by a pedestrian 103; an Nth remote vehicle 124 (where "N" refers to any positive whole number greater than one); and an edge server 102. These elements of the operating environment 100 are depicted by way of illustration. In practice, the operating environment 100 may include one or more of the elements depicted in FIG. 1. The Nth remote vehicle 124 may be referred to as a remote vehicle 124.

In some embodiments, the ego vehicle 123, the remote vehicle 124, and the network 105 are elements of a vehicular micro cloud 194. The edge server 102 is not an element of the vehicular micro cloud 194. The edge server 102 and the smartphone 172 are depicted in FIG. 1 with a dashed line to indicate that they are optional features of the operating environment 100.

In the depicted embodiment, the ego vehicle 123, the remote vehicle 124, the edge server 102, and the pedestrian device 171 include similar elements. For example, each of these elements of the operating environment 100 include their own processor 125, bus 121, memory 127, communication unit 145, processor 125, sensor set 126, and pedestrian navigation system 199 (with the exception that the pedestrian device 171 includes a client, which is not pictured, and not a pedestrian navigation system 199). These elements of the ego vehicle 123, the remote vehicle 124, the edge server 102, and the pedestrian device 171 provide the same or similar functionality relative to one another. Accordingly, these descriptions will not be repeated in this description.

In the depicted embodiment, the ego vehicle 123 and remote vehicle 124 may each store similar digital data.

The vehicular micro cloud 194 may be a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. In this patent application the vehicular micro cloud 194 may be a stationary vehicular micro cloud or a mobile vehicular micro cloud. Each of the ego vehicle 123 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used in this patent application, a vehicular micro cloud and a micro-vehicular cloud mean the same thing.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, the memory 127 of one or more of the endpoints stores member data 189. The member data 189 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 189 describes logical associations between endpoints which are a necessary component of the vehicular micro cloud 194 and serves the differentiate the vehicular micro cloud 194 from a mere V2X network. In some embodiments, a vehicular micro cloud 194 must include a hub vehicle and this is a further differentiation from a vehicular micro cloud 194 and a V2X network or a group or clique of vehicles which is not a vehicular micro cloud 194.

The vehicular micro cloud 194 does not include a hardware server. Accordingly, the vehicular micro cloud 194 may be described as serverless.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data 189. The network 105 also does not include a hub vehicle.

In some embodiments, one or more of the ego vehicle 123 and the remote vehicle 124 are DSRC-equipped vehicles. For example, the ego vehicle 123 includes a DSRC-compliant GPS unit 150 and a DSRC radio (e.g., the V2X radio 144 is a DSRC radio in embodiments where the ego vehicle 123 is a DSRC-equipped vehicle) The network 105 may include a DSRC communication channel shared among the ego vehicle 123 and a second vehicle such as the remote vehicle 124.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105.

The ego vehicle 123 includes one or more of the following elements: a processor 125; a sensor set 126; a DSRC-compliant GPS unit 150; a communication unit 145; an onboard unit 139; a memory 127; and a pedestrian navigation system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the pedestrian navigation system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data 191 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the DSRC-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data 191 that describes images or other measurements of the physical environment and objects or other vehicles present in the roadway environment such as pedestrians, animals, traffic signs, traffic lights, potholes, etc.

The physical environment may include a roadway region, parking lot, or parking garage that is proximate to the ego vehicle 123. The sensor data 191 may describe measurable aspects of the physical environment.

In some embodiments, the sensors of the sensor set 126 are operable to collect sensor data 191. The sensors of the sensor set 126 include any sensors that are necessary to measure and record the measurements described by the sensor data 191. In some embodiments, the sensor data 191 includes any measurements that are necessary to generate the other digital data stored by the memory 127.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this vehicle 123 as provided by the DSRC-compliant GPS unit 150.

In some embodiments, the GPS data describes a location of a queue with lane-level accuracy.

An example process for generating GPS data describing a geographic location of an object (e.g., a queue, the ego vehicle 123, the remote vehicle 124, or some other object located in a roadway environment) is now described according to some embodiments. In some embodiments, the pedestrian navigation system 199 include code and routines that are operable, when executed by the processor 125, to cause the processor to: analyze (1) GPS data describing the geographic location of the ego vehicle 123 and (2) sensor data 191 describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the DSRC-compliant GPS unit 150 includes hardware that wirelessly communicates with a GPS satellite (or GPS server) to retrieve GPS data that describes the geographic location of the ego vehicle 123 with a precision that is compliant with the DSRC standard.

The DSRC standard requires that GPS data be precise enough to infer if two vehicles (one of which is, for example, the ego vehicle 123) are located in adjacent lanes of travel on a roadway. In some embodiments, the DSRC-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the pedestrian navigation system 199 described herein may analyze the GPS data provided by the DSRC-compliant GPS unit 150 and determine what lane the ego vehicle 123 is traveling in based on the relative positions of two or more different vehicles (one of which is, for example, the ego vehicle 123) traveling on a roadway at the same time.

By comparison to the DSRC-compliant GPS unit 150, a conventional GPS unit which is not compliant with the DSRC standard is unable to determine the location of a vehicle (e.g., the ego vehicle 123) with lane-level accuracy. For example, a typical parking space is approximately 3 meters wide. However, a conventional GPS unit only has an accuracy of plus or minus 10 meters relative to the actual location of the ego vehicle 123. As a result, such conventional GPS units are not sufficiently accurate to enable the pedestrian navigation system 199 to determine the lane of travel of the ego vehicle 123. This measurement improves the accuracy of the GPS data describing the location of parking spaces used by the pedestrian navigation system 199 when providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the parking space is digital data that describes a geographic location of an object. One or more of these two types of GPS data may have lane-level accuracy. In some embodiments, one or more of these two types of GPS data are described by the sensor data 191.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the pedestrian navigation system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some or all of the communications necessary to execute the methods described herein are executed using full-duplex wireless communication as described in U.S. Pat. No. 9,369, 262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 144. The V2X radio 144 is a hardware unit that includes one or more transmitters and one or more receivers that is operable to send and receive any type of V2X message. In some embodiments, the V2X radio 144 is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the example general method or below with reference to the method 300 depicted in FIG. 3 are transmitted by the C-V2X radio on the upper 30 MHz of the 5.9 GHz band (i.e., 5.895-5.925 GHz) as directed by the pedestrian navigation system 199.

In some embodiments, the V2X radio 144 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio 144 includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSM messages which are regularly broadcast by the V2X radio 144 (e.g., at an interval of once every 0.10 seconds).

In some embodiments, the V2X radio 144 includes any hardware or software which is necessary to make the ego vehicle 123 compliant with the DSRC standards. In some embodiments, the DSRC-compliant GPS unit 150 is an element of the V2X radio 144.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data 191; the modified path data 192; the driving path data 143; the digital twin data 184; the pedestrian data 196; the walking path data 146; the risk data 198; the member data 189; the sensor data 191; and the technical data 147. These elements of the memory were described above with reference to the first example general method and the second example general method, and so, those descriptions will not be repeated here.

In some embodiments, the pedestrian navigation system 199 includes code and routines that are operable, when executed by the processor 125, to execute one or more steps of one or more of the method 300 described herein with reference to FIG. 3. In some embodiments, the pedestrian navigation system 199 includes code and routines that are operable, when executed by the processor 125, to execute one or more steps of the first example general method described above. In some embodiments, the pedestrian navigation system 199 includes code and routines that are operable, when executed by the processor 125, to execute one or more steps of the second example general method described above.

In some embodiments, the pedestrian navigation system 199 is an element of the onboard unit 139 or some other onboard vehicle computer.

In some embodiments, the pedestrian navigation system 199 is implemented using hardware including a field-programmable gate array ("FPGA") or an application-specific integrated circuit ("ASIC"). In some other embodiments, the pedestrian navigation system 199 is implemented using a combination of hardware and software.

The remote vehicle 124 includes elements and functionality which are similar to those described above for the ego vehicle 123, and so, those descriptions will not be repeated here. In some embodiments, the ego vehicle 123 and the remote vehicle 124 are located in a roadway environment 170. The roadway environment is a portion of the real-world that includes a roadway, the ego vehicle 123, the remote vehicle 124, and a pedestrian. The roadway environment 170 may include other elements such as the vehicular micro cloud 194, roadway signs, environmental conditions, traffic, etc.

The edge server 102 is a connected processor-based computing device that is not a member of the vehicular micro cloud 194 and includes an instance of the pedestrian navigation system 199 and a memory 127. In some embodiments, the memory 127 stores the information data 182.

In some embodiments, the edge server 102 is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the pedestrian navigation system 199 and a non-transitory memory that stores at least one instance of the information data 182. The edge server 102 may include a backbone network.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123 and the remote vehicle 124), and optionally devices such as a roadside unit, form a cluster of interconnected vehicles that are located at a same geographic region. These connected vehicles (and, optionally, connected devices) are interconnected via Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the edge server 102. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the pedestrian navigation system 199 includes encryption keys for encrypting wireless messages and decrypting the wireless messages described herein.

The pedestrian 103 is a human user. In some embodiments, the pedestrian 103 is near a roadway. For example, the pedestrian 103 is trying to cross a roadway. The pedestrian 103 is wearing a pedestrian device 171. The pedestrian device 171 includes a processor-based computing device that includes a processor, a memory, a client stored in the memory and accessible to be executed by the processor, and pedestrian data 196 stored in the memory. The client causes the camera of the pedestrian device 171 to capture images 173 of the roadway environment 170. The images are described by the pedestrian data 196. The client, when executed by the processor of the pedestrian device, causes the communication unit of the pedestrian device 171 to transmit the pedestrian data 196 to a group of vehicles (e.g., the ego vehicle 123 and the remote vehicle 124) via the network 105. For example, the client causes the communication unit to transmit a V2X message including the pedestrian data 196 as its payload to the group of vehicles.

In some embodiments, the pedestrian device 171 is worn on a head of the pedestrian 103. In some embodiments, the pedestrian device 171 is worn by the pedestrian 103 on a location that is not their arm or hand.

In some embodiments, the pedestrian device 171 is a pair of smart glasses or AR goggles. The pedestrian device 171 is not a smartphone 172.

Figure 2:
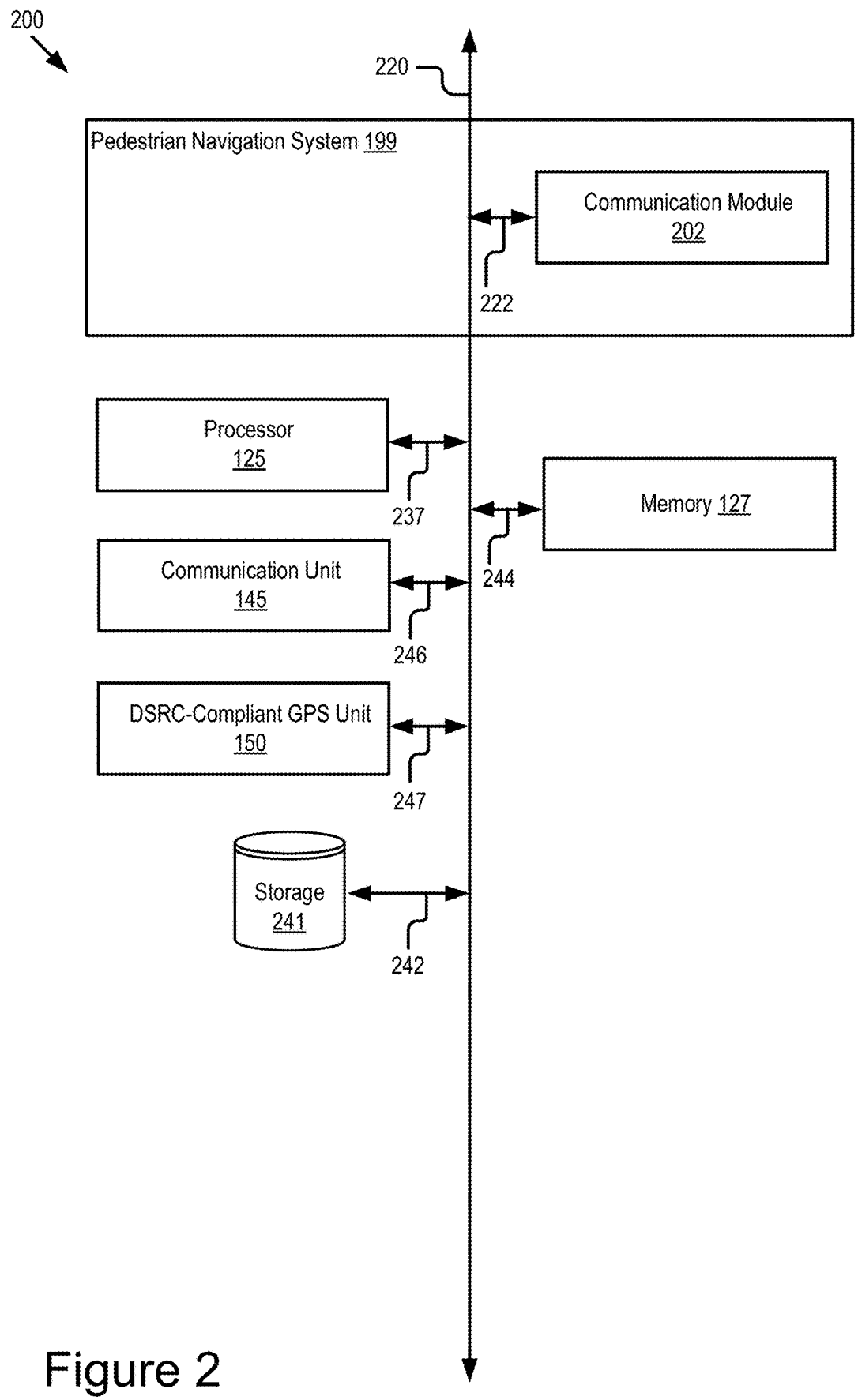
FIG. 2 is a block diagram illustrating an example computer system including a pedestrian navigation system according to some embodiments.

Referring now to FIG. 2, depicted is a block diagram illustrating an example computer system 200 including a pedestrian navigation system 199 according to some embodiments.

In some embodiments, the computer system 200 may include a special-purpose computer system that is programmed to perform one or more steps of one or more of the method 300 described herein with reference to FIG. 3. In some embodiments, the computer system 200 may include a special-purpose computer system that is programmed to perform one or more steps of one or more of the example general method described above.

In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the pedestrian navigation system 199; a processor 125; a communication unit 145; a DSRC-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The DSRC-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to FIG. 1, and so, these descriptions will not be repeated here: the processor 125; the communication unit 145; the DSRC-compliant GPS unit 150; and the memory 127.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the pedestrian navigation system 199 includes code and routines that are operable, when executed by the processor 125, to cause the processor 125 to execute one or more steps of the method 300 described herein with reference to FIG. 3. In some embodiments, the pedestrian navigation system 199 includes code and routines that are operable, when executed by the processor 125, to cause the processor 125 to execute one or more steps of the example general method described above.

In the illustrated embodiment shown in FIG. 2, the pedestrian navigation system 199 includes a communication module 202.

The communication module 202 can be software including routines for handling communications between the pedestrian navigation system 199 and other components of the computer system 200. In some embodiments, the communication module 202 can be a set of instructions executable by the processor 125 to provide the functionality described below for handling communications between the pedestrian navigation system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the pedestrian navigation system 199 and stores the data in one or more of the storage 241 and the memory 127.

In some embodiments, the communication module 202 may handle communications between components of the pedestrian navigation system 199 or the computer system 200.

Referring now to FIG. 3, depicted is a flowchart of an example method 300. The method 300 includes step 305, step 310, step 315, and step 320 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for collaborative computing executed by a set of onboard computers for a group of connected vehicles, the method comprising:

comparing, by the set of onboard computers, pedestrian data generated by a pedestrian device and sensor data generated by the group of connected vehicles to outputs of a set of historical digital twin simulations to determine which simulation from the set include a simulated scenario that is most similar to a scenario indicated by the pedestrian data and the sensor data and selecting digital twin data describing this simulated scenario from the set;

predicting, based on the digital twin data, that the pedestrian is at risk of a collision;

determining modified path data describing a modified walking path for the pedestrian; and transmitting the modified path data to the pedestrian device so that the pedestrian is informed about the modified walking path and the risk is modified.

2. The method of claim 1 further comprising an assigning step including assigning different tasks included in the method to different members of the group of connected vehicles.

3. The method of claim 2, wherein the assigning step is executed by a hub vehicle of a vehicular micro cloud.

4. The method of claim 2, wherein the assigning is based on technological abilities of a set of technological equipment included in the connected vehicles.

5. The method of claim 2, wherein the assigning is based on a future driving path of the connected vehicles and how long each task takes to complete.

6. The method of claim 1, wherein the modified path data is determined by analysis of the digital twin data.

7. The method of claim 1 further comprising a feedback loop that includes determining whether a risk of collision was reduced by the modified walking path and updating the digital twin data based on whether the determination of whether a risk of collision was reduced.

8. The method of claim 1, wherein the group of connected vehicles is not a vehicular micro cloud.

9. A computer program product stored in a set of onboard vehicle computers included in a group of connected vehicles, the computer program product comprising computer code that is operable, when executed by the set of onboard vehicle computers, to cause the set of onboard vehicle computers to provide collaborative computing by executing steps including:

comparing, by the set of onboard computers, pedestrian data generated by a pedestrian device and sensor data generated by the group of connected vehicles to outputs of a set of historical digital twin simulations to determine which simulation from the set include a simulated scenario that is most similar to a scenario indicated by the pedestrian data and the sensor data and selecting digital twin data describing this simulated scenario from the set;

predicting, based on the digital twin data, that the pedestrian is at risk of a collision;

determining modified path data describing a modified walking path for the pedestrian; and transmitting the modified path data to the pedestrian device so that the pedestrian is informed about the modified walking path and the risk is reduced.

10. The computer program product of claim 9 further comprising an assigning step including assigning different steps to different members of the group of connected vehicles.

11. The computer program product of claim 10, wherein the assigning step is executed by a hub vehicle of a vehicular micro cloud.

12. The computer program product of claim 10, wherein the assigning is based on technological abilities of a set of technological equipment included in the connected vehicles.

13. The computer program product of claim 10, wherein the assigning is based on a future driving path of the connected vehicles and how long each task takes to complete.

14. A system comprising:

a group of connected vehicles each including a communication unit that is communicatively coupled to an onboard vehicle computer so that the group includes a set of onboard vehicle computers, wherein the set of onboard vehicle computers are executing computer-executable code that is operable, when executed by the set of onboard vehicle computers, to cause the set of onboard vehicle computers to provide collaborative computing by executing tasks including:

comparing, by the set of onboard computers, pedestrian data generated by a pedestrian device and sensor data generated by the group of connected vehicles to outputs of a set of historical digital twin simulations to determine which simulation from the set include a simulated scenario that is most similar to a scenario indicated by the pedestrian data and the sensor data and selecting digital twin data describing this simulated scenario from the set;

predicting, based on the digital twin data, that the pedestrian is at risk of a collision;

determining modified path data describing a modified walking path for the pedestrian; and transmitting the modified path data to the pedestrian device so that the pedestrian is informed about the modified walking path and the risk is modified.

15. The system of claim 14, wherein an onboard vehicle computer of a hub vehicle included in the group of connected vehicles is further operable to execute an assigning operation that includes assigning different tasks to different members of the group of connected vehicles so that the different tasks are executed by the onboard vehicle computer of the member to which it is assigned.

16. The system of claim 15, wherein the assigning is based on technological abilities of a set of technological equipment included in each of the group of connected vehicles so that more difficult tasks are assigned to connected vehicles having the more technological abilities and less difficult tasks are assigned to connected vehicles having less technological abilities.

17. The system of claim 15, wherein the assigning is based on a future driving path of the connected vehicles and how long each task takes to complete.

18. The system of claim 14, wherein the modified path data is determined by analysis of the digital twin data.

19. The system of claim 14 wherein the tasks further comprise executing a feedback loop that includes determining whether a risk of collision was reduced by the modified walking path.

20. The system of claim 19, wherein the feedback loop further includes updating the digital twin data based on whether the determination of whether the risk of collision was reduced.

* * * * *